United States Patent [19]

Kaschner et al.

[11] Patent Number: 4,553,893
[45] Date of Patent: Nov. 19, 1985

[54] ARTICLE TRANSFER APPARATUS

[75] Inventors: William C. Kaschner, Alpena, Mich.; Elroy Bobolts, Jr., Pembroke Pines, Fla.

[73] Assignee: Besser Company, Alpena, Mich.

[21] Appl. No.: 702,631

[22] Filed: Feb. 19, 1985

Related U.S. Application Data

[60] Division of Ser. No. 558,379, Dec. 5, 1983, Pat. No. 4,505,630, which is a continuation of Ser. No. 104,237, Dec. 17, 1979, abandoned, which is a continuation of Ser. No. 871,597, Jan. 23, 1978, abandoned.

[51] Int. Cl.$^4$ .............................................. F27B 9/02
[52] U.S. Cl. .................................... 414/152; 198/341; 198/345; 198/464.1; 198/575; 414/584
[58] Field of Search ............... 414/152, 154, 180, 279, 414/284, 396, 401, 584; 198/341, 345, 466, 575

[56] References Cited

U.S. PATENT DOCUMENTS 3,412,878 11/1968 Todd ............................... 414/180 X
4,298,305 11/1981 Neth ............................... 414/180 X Primary Examiner—Robert G. Sheridan
Attorney, Agent, or Firm—Learman & McCulloch

[57] ABSTRACT

Apparatus and methods for transferring articles, such as concrete blocks, from a conveyor to a curing kiln and return comprise a carriage movable along a path leading from the block conveyor to any selected one of a number of curing kilns. The carriage supports a rotary turntable on which is mounted a transfer vehicle provided with article supporting forks that are vertically movable so as to shift articles off and onto the block conveyor, deposit the articles within the kiln, and retrieve the articles from the kiln. The transfer vehicle is movable horizontally relatively to the turntable to enable the article supporting forks to overlie the block conveyor, and the transfer vehicle also is movable horizontally relatively to the turntable and carriage into and out of the selected kiln.

7 Claims, 11 Drawing Figures

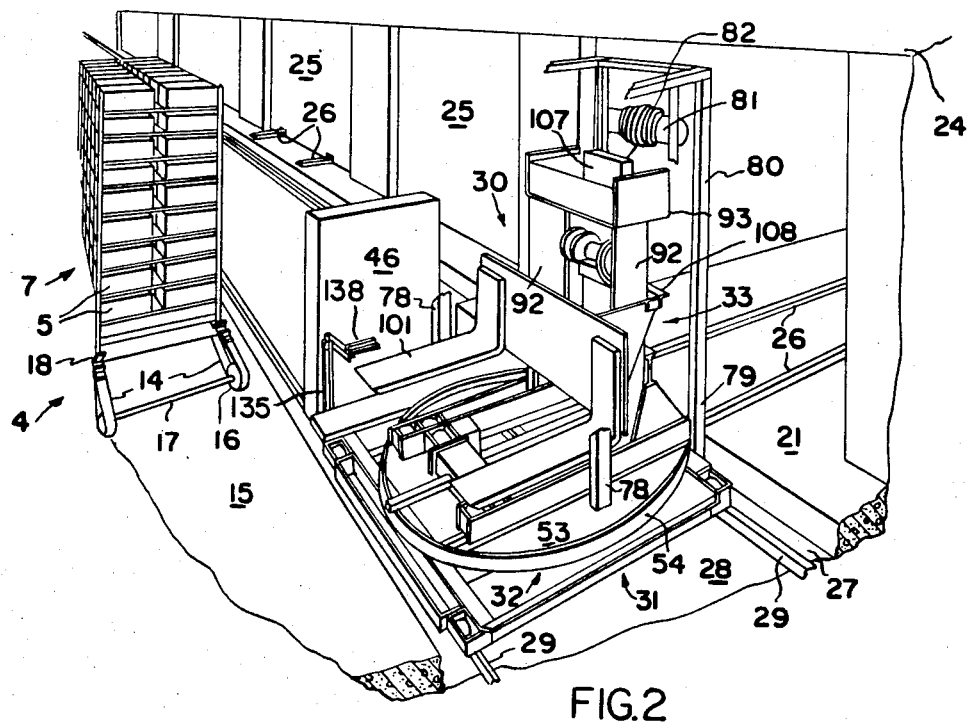
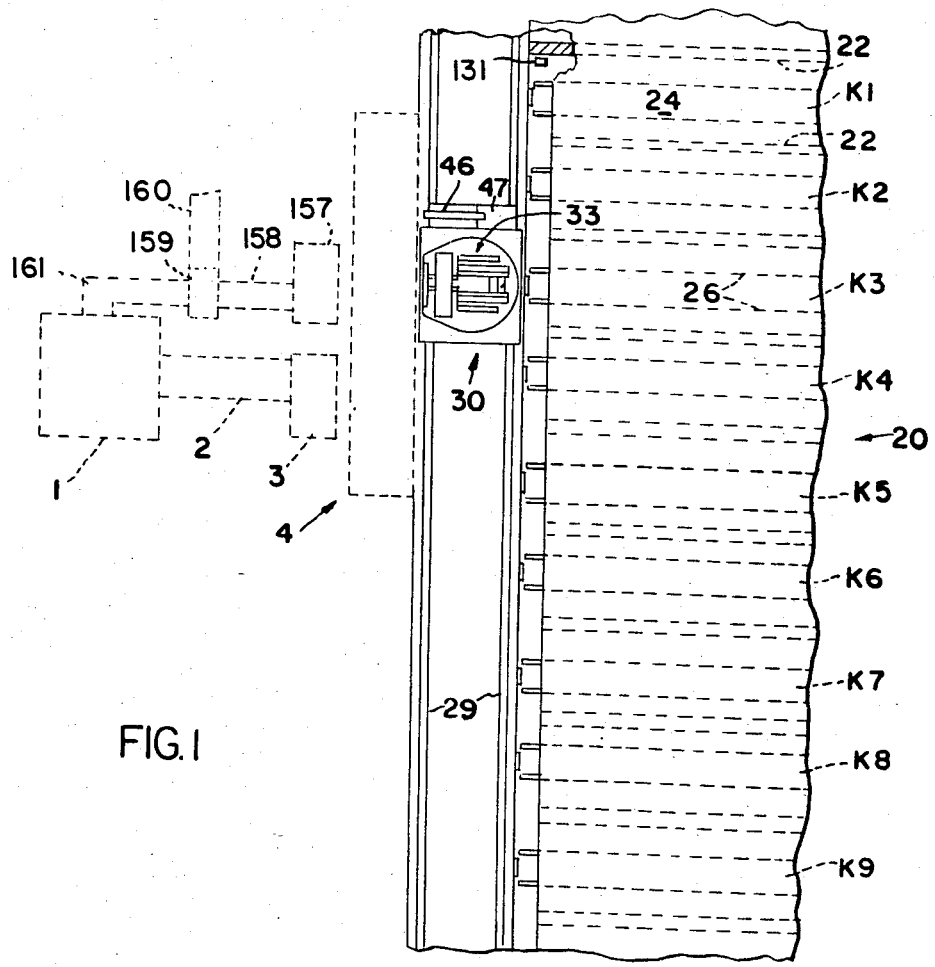
FIG.2
FIG.1

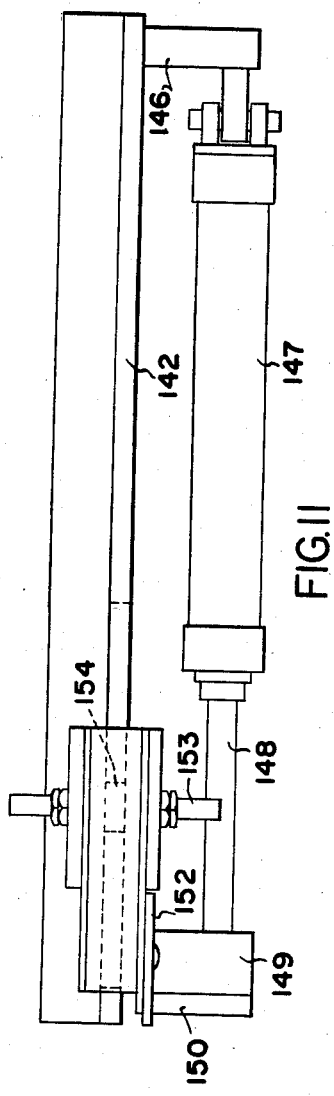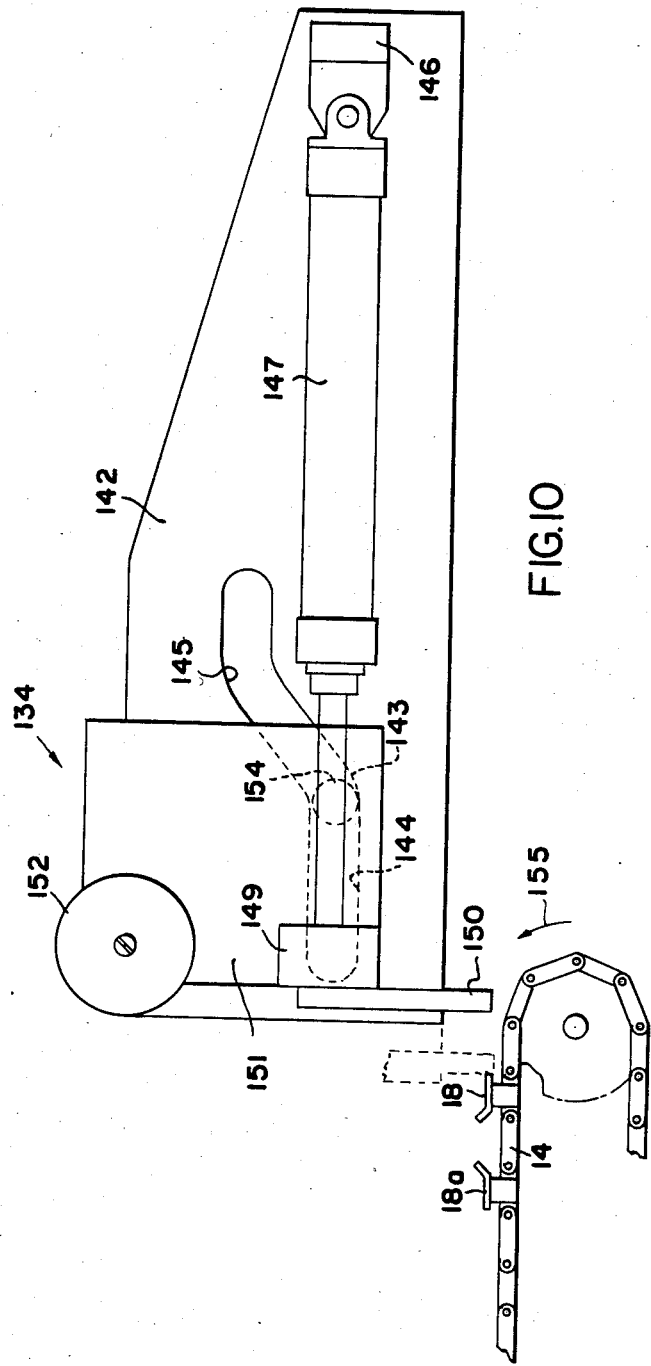

ARTICLE TRANSFER APPARATUS

This is a divisional of co-pending application Ser. No. 558,379 filed Dec. 5, 1983, now U.S. Pat. No. 4,505,630, which is a continuation of Ser. No. 104,237, Dec. 17, 1979 (now abandoned), which was a continuation of Ser. No. 871,597, filed Jan. 23, 1978 (now abandoned).

BACKGROUND OF THE INVENTION

In the manufacture of certain kinds of articles, such as concrete blocks, green blocks are molded in a molding machine and placed on racks for curing. Curing of the blocks is facilitated by placing them in a kiln in which the temperature and humidity may be controlled. Following curing of the blocks they are retrieved from the kiln, separated from their supporting racks, and assembled in groups or cubes for storage or transport.

Heretofore the transfer of green blocks to a curing kiln and the transfer of cured blocks from the kiln to the storage or shipping area have been accomplished largely by conveyors, fork lift trucks, or a combination thereof. The utilization of trucks and the like is unsatisfactory in many respects. For example, the speed of the vehicle cannot always be controlled with consequent dropping and breaking of green or cured blocks, and the removal and replacement of block-support racks from and on conveyors is dependent almost wholly upon the skill of the fork lift truck's operator. Further, the use of conventional fork lift trucks creates ventilation problems if they are powered by internal combustion engines or requires elaborate recharging systems if they are electrically powered.

SUMMARY OF THE INVENTION

Apparatus and methods according to the invention are adapted for use in conjunction with conventional concrete block machinery which functions in a known manner to mold and palletize green concrete blocks and place the green blocks and their pallets on racks removably mounted on pads forming part of a rack conveyor. Apparatus according to the invention also is intended for use with conventional curing kilns in which racks of green blocks may be placed for curing. Since the curing of green blocks requires more time than their molding, the block manufacturing facility preferably utilizes a plurality of kilns so as to enable the manufacture of blocks to proceed substantially continuously.

Article transfer apparatus constructed and arranged in accordance with the invention includes a carriage that is movable from the block rack conveyor along a path leading to any selected one of a number of kilns, and return, thereby establishing two-way communication between the block rack conveyor and any of the kilns. The carriage supports a transfer vehicle having article supporting arms or forks which are capable of holding a rack of blocks during movement of the carriage. The transfer vehicle is capable of movement relative to the carriage so as to enable the article supporting arms or forks to be projected beneath a rack of blocks to remove the rack from its conveyor. The transfer vehicle also is capable of movement relative to the carriage into and out of any one of the kilns so as to permit a rack of blocks to be placed in and removed from the kiln.

In many block making facilities the rack conveyor and the kilns will be located on opposite sides of the path along which the carriage is movable. To enable transfer apparatus according to the invention to be adaptable to such installations, the transfer vehicle preferably is mounted on the carriage by means of a rotary turntable which enables the article supporting arms or forks to face toward either side of the path of movement of the carriage.

DESCRIPTION OF THE DRAWINGS

Apparatus constructed and arranged in accordance with a preferred embodiment of the invention is illustrated in the accompanying drawings, wherein:

FIG. 1 is a fragmentary, diagrammatic plan view of a typical concrete block-making facility;

FIG. 2 is a fragmentary, perspective view of a portion of the apparatus shown in FIG. 1;

FIG. 10 is a fragmentary, side elevational view of apparatus for registering a rack with a rack conveyor; and FIG. 11 is a top plan view of the apparatus shown in FIG. 10.

Figure 3:
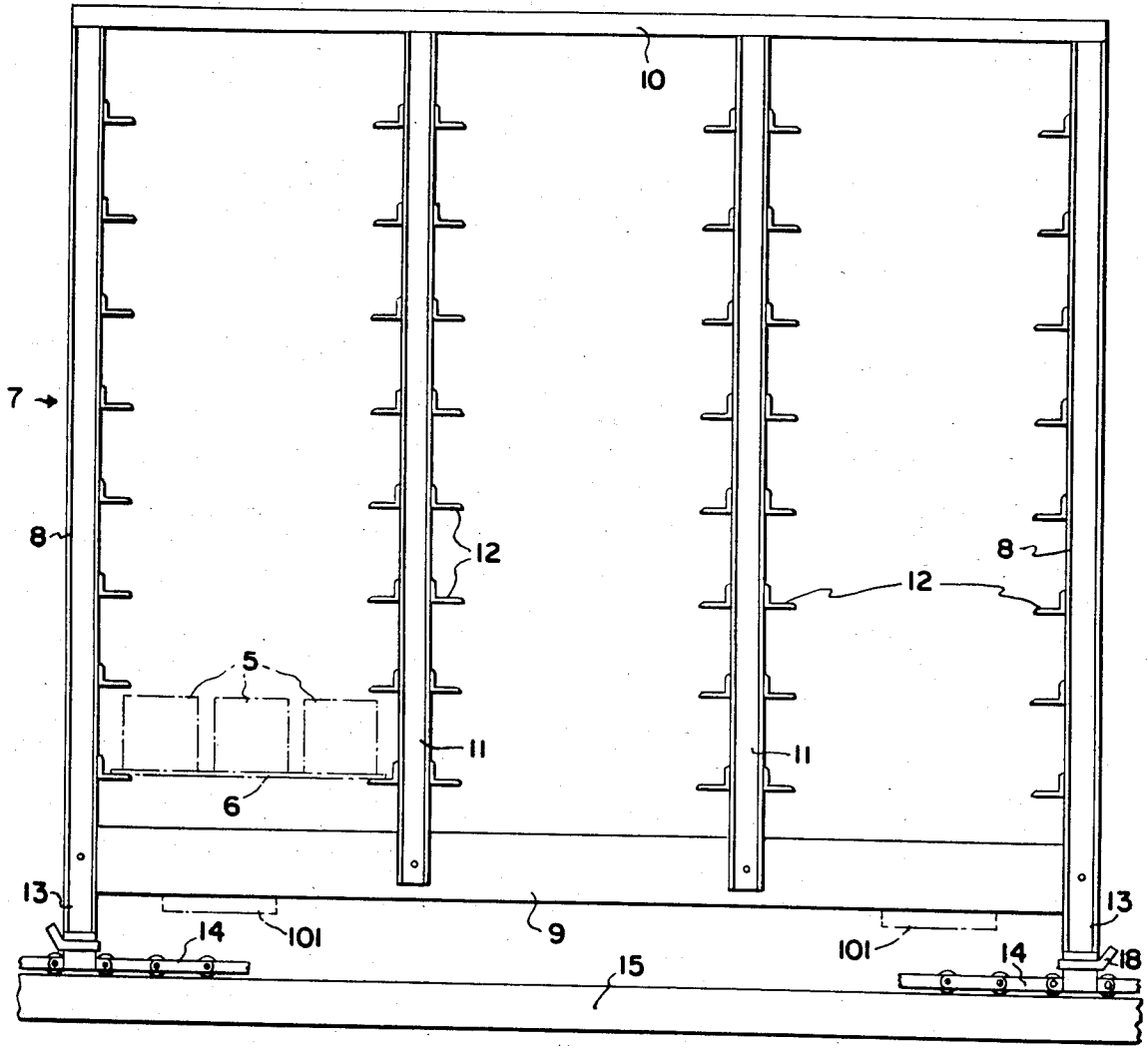
FIG. 3 is an elevational view of a typical rack mounted on a rack conveyor.

A typical block-making facility is diagrammatically illustrated in FIG. 1 as comprising a block molding machine 1 having a conveyor 2 extending therefrom toward a rack loader 3 of known construction which is located adjacent a rack conveyor 4. The molding machine 1 functions to mold blocks 5 (FIG. 3) successively on a pallet 6, following which the palletized blocks are delivered by the conveyor 2 to the rack loader 3 which functions to place the palletized blocks in a rack 7 (FIG. 3) having two pairs of end frame members 8 joined by upper and lower frame bars 9 and 10, respectively. Intermediate uprights 11 are fixed to the upper and lower frame members. Each of the uprights and the end frame members is provided with a number of vertically spaced brackets 12 between which a number of pallets 6 may be supported. The end frame members 8 extend below the lower frame members 9 to form downwardly projecting legs 13. The rack loader 3 includes means (not shown) of conventional construction for moving pallets and blocks onto the racks 7 located on the conveyor 4.

In the disclosed embodiment, the rack conveyor 4 comprises a pair of endless, parallel chains 14, the upper runs of which bear on a horizontal support 15. The chains are trained around sprockets 16 fixed on shafts 17 that are driven incrementally by a suitable driving motor (not shown). At intervals along each chain is a pad 18, the spacing between adjacent pads corresponding to the spacing between the supporting legs 13 of the rack 7, thereby enabling the rack to be supported upon the pads and moved by the chains 14.

The block-making facility also includes a curing kiln 20 having a plurality of individual compartments K1 .. . K9. Each kiln compartment has a floor 21, a pair of spaced apart side walls 22, a rear wall 23 (FIG. 9), and a roof or cover 24. The front of each kiln compartment is open, but may be closed by an overhead door 25. On the floor 21 of each compartment is a pair of spaced apart tracks on rails 26 which extend the full length of each compartment.

In the disclosed block-making facility a pit 27 is provided between the rack conveyor 4 and the kiln 20. On the floor 28 of the pit is a pair of parallel rails 29 which define a path of movement between the conveyor 4 and the kiln 20.

Apparatus for transferring blocks between the rack conveyor 4 and the kiln 20 is designated generally by the reference character 30 and comprises three principal components, namely, a carriage 31, a turntable 32 mounted on the carriage and a transfer vehicle 33 carried by the turntable.

THE CARRIAGE

Figure 4:
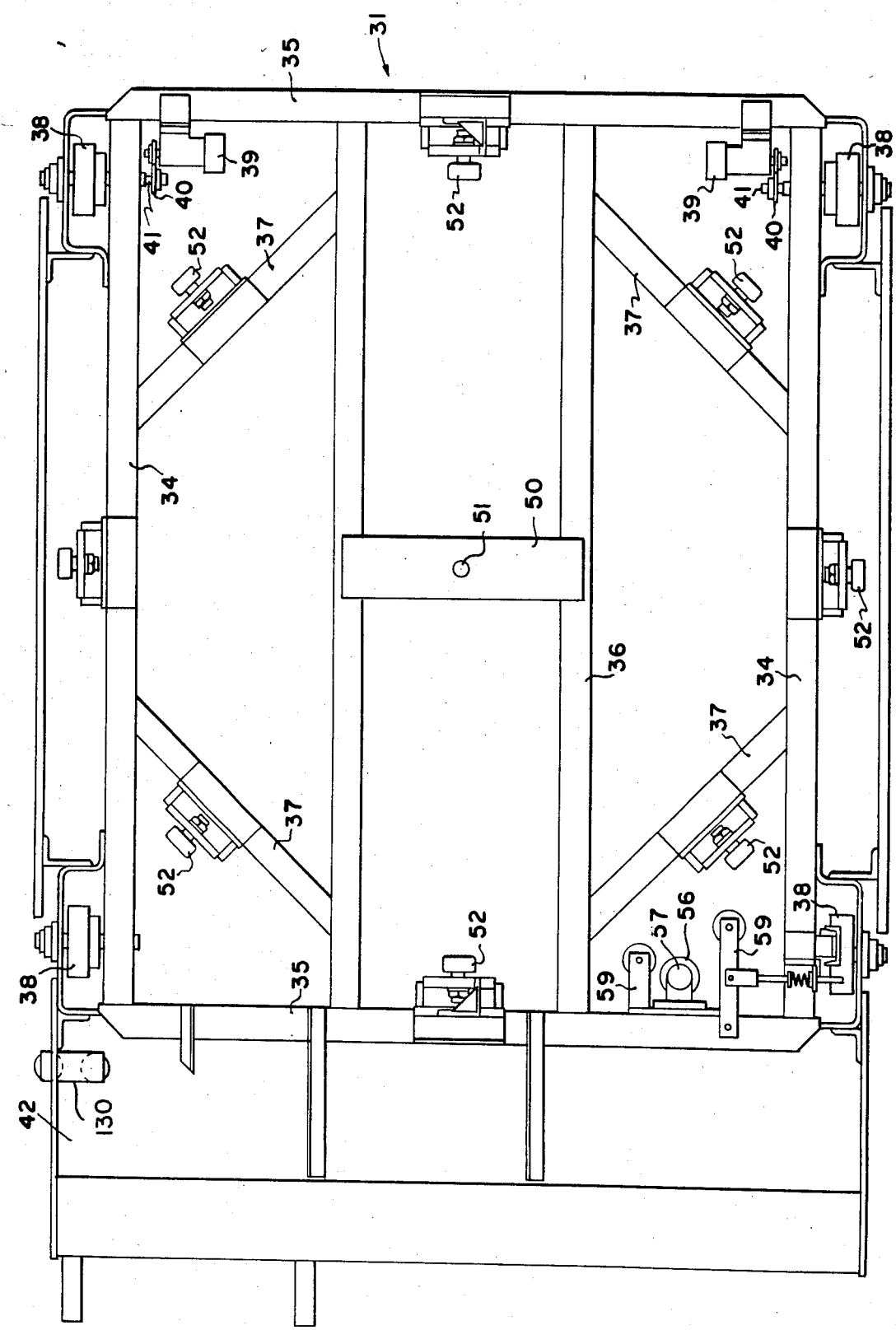
FIG. 4 is a top plan view of the carriage.
Figure 5:
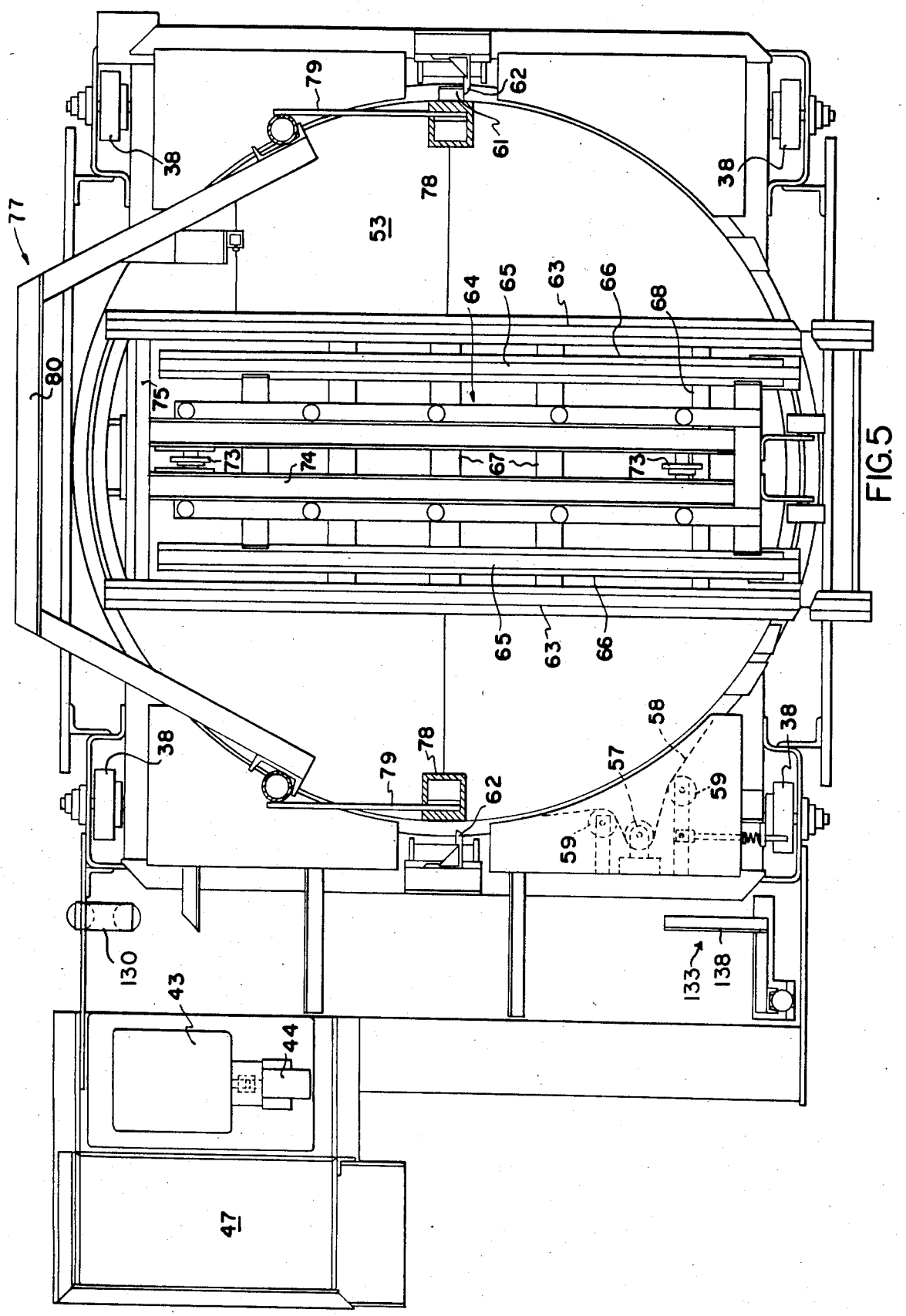
FIG. 5 is a view similar to FIG. 4, but illustrating the turntable mounted on the carriage.
Figure 6:
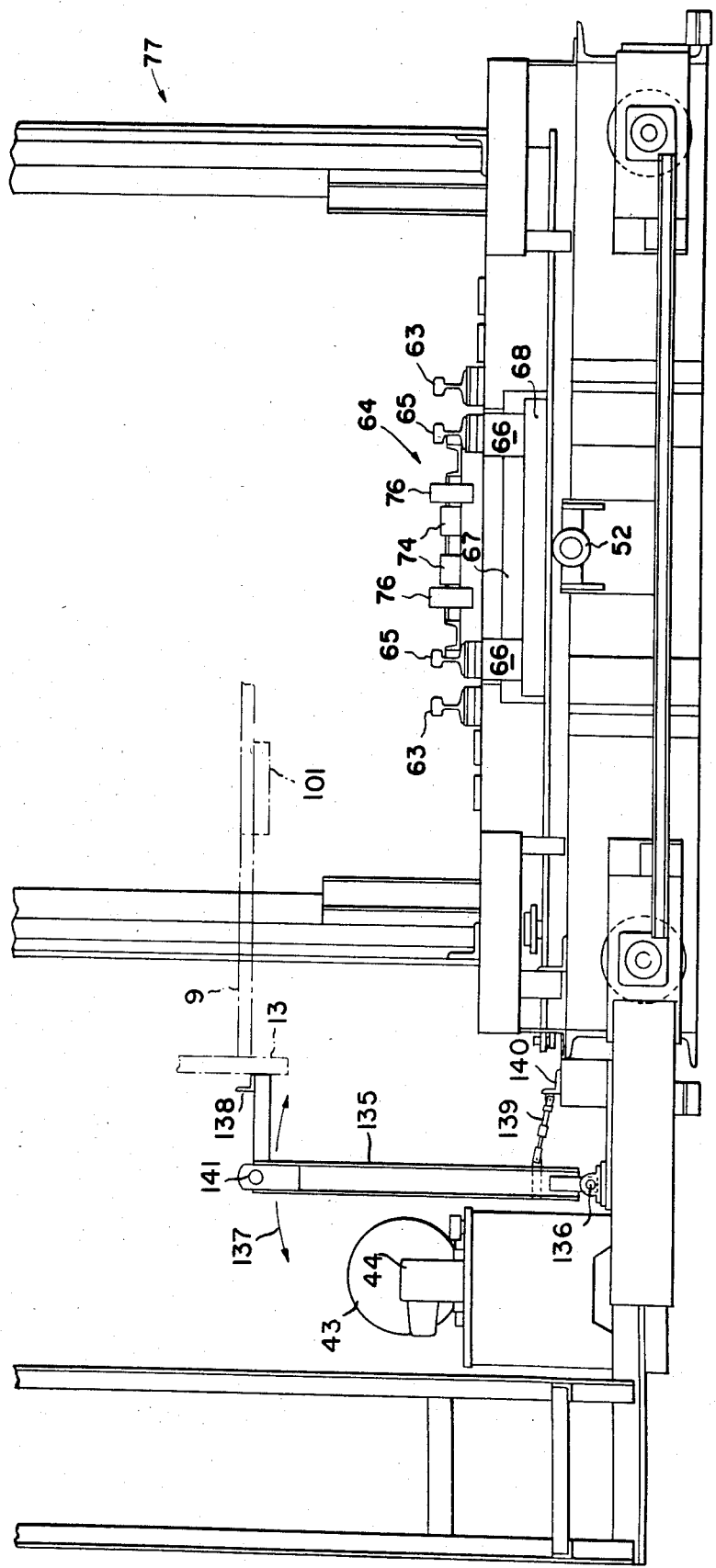
FIG. 6 is a side elevational view of the structure shown in FIG. 5.

The carriage 31 is best illustrated in FIGS. 4–6 and comprises a frame composed of a pair of spaced apart side bars 34 joined at corresponding ends to end bars 35. The frame also includes intermediate cross bars 36 which span the end bars 35 and diagonal braces 37 extending between the side bars 34 and the cross bars 36. At each corner of the carriage frame is journaled a flanged wheel 38 which rides upon one of the rails 29. At one end of the carriage 31 is a pair of reversible hydraulic motors 39 each of which is drivingly connected by gearing 40 to the axle 41 of the associated wheel 38. The hydraulic motors are capable of driving the associated wheel 38 in each of two opposite directions and of stopping their rotation.

At the other end of the carriage 31 is a platform 42 on which an electric motor 43 is mounted. The motor is coupled to a hydraulic pump 44 which is capable of pumping hydraulic fluid from a reservoir 45 to the hydraulic motors 39 through suitable conduits and valves (not shown). The platform 42 also supports a control console 46 (FIG. 2) and an operator's station 47.

It will be understood that the hydraulic system leading from the pump 44 to the motors 39 is such as to effect driving of the driven wheels 38 so as to cause the carriage 31 to move in either of two opposite directions along the path of the rails 29. It also will be understood that driving of the wheels 38 may be at a selected rate of speed and that the manipulation of the associated valving will function to accelerate and decelerate, as well as stop, the movements of the carriage 31.

The carriage 31 also is provided with means for rotatably mounting the turntable 32. Such mounting means includes a centrally located plate 50 having an opening 51 therein, the plate being secured to the two cross bars 36. The turntable mounting means also includes a plurality of rollers 52 mounted on the various frame and brace members for rotation about horizontal axes, all of the rollers being located in the same horizontal plane.

THE TURNTABLE

Figure 7:
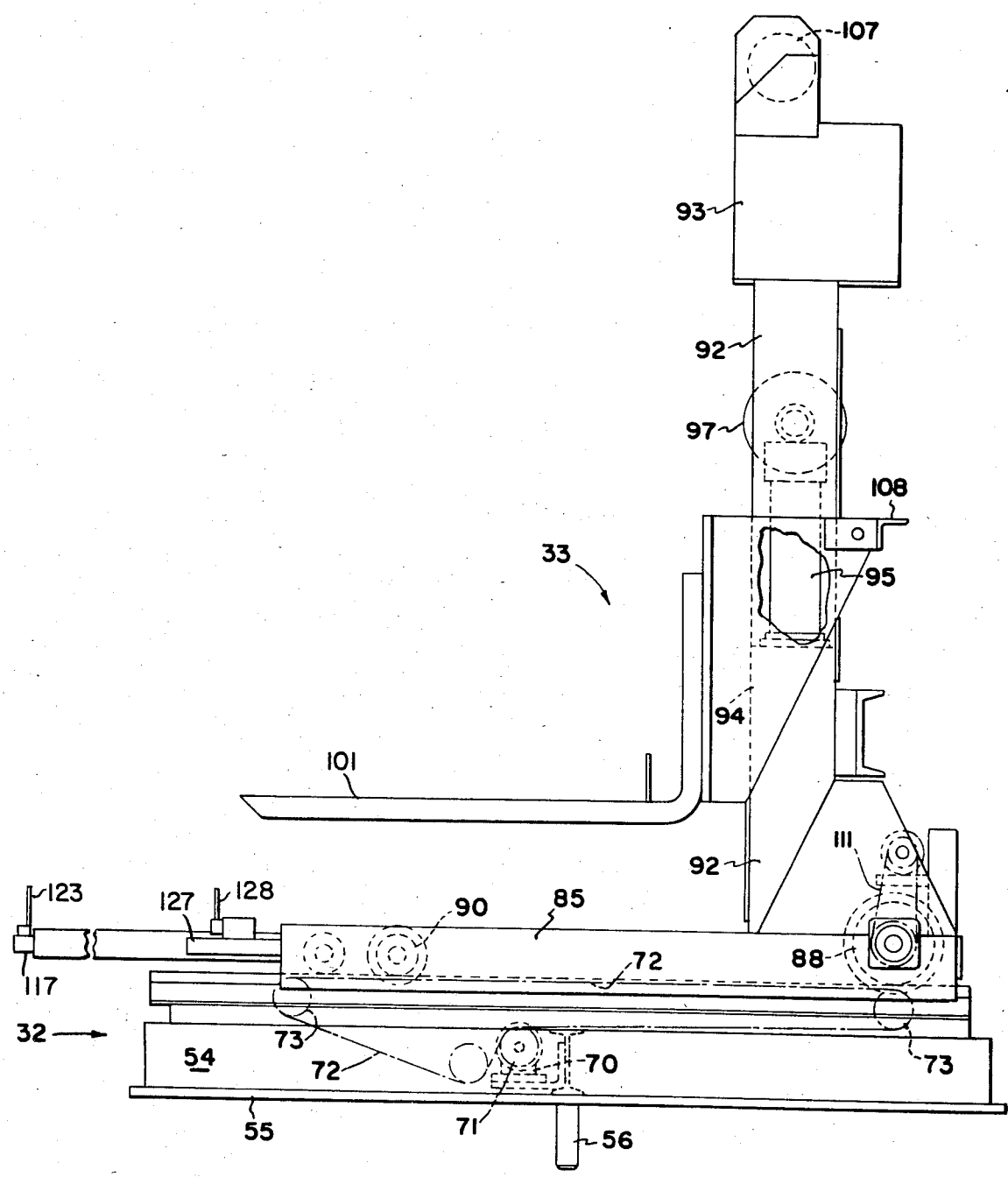
FIG. 7 is a side elevational view illustrating the transfer vehicle in one position upon the rotary turntable.

The turntable 32 is best illustrated in FIGS. 5-7 and comprises a platform 53 having a depending skirt 54 terminating in a horizontal flange 55 which rests upon the rollers 52. Depending from the platform 53 is a spindle 56 that is journaled in the opening 51 of the plate 50. The platform 53 thus is rotatable relatively to the carriage 31 in a horizontal plane about the axis of the spindle 56.

Means for rotating the turntable comprises a hydraulic motor 57 (FIGS. 4 and 5) mounted on the carriage 31 and supplied with fluid from the reservoir 45 via suitable conduits and valve (not shown). The motor 57 drives a sprocket wheel 58 around which is trained a chain 59 having its opposite ends fixed to the skirt 54 of the turntable. Suitable chain tensioners 60 also are carried by the carriage 31 to maintain the chain 59 taut. Rotation of the motor 58 in either of two opposite directions will cause corresponding rotation of the turntable 32.

Rotation of the turntable is limited to about 180° by means of a stop 61 (FIG. 5) projecting radially from the skirt 54 and a pair of diametrically opposed abutments 62 carried by the frame of the carriage 31.

Mounted atop and fixed to the platform 53 is a pair of spaced apart rails 63. In a recess formed in the platform and skirt 54 between the rails 63 is a ladder-like auxiliary rail assembly 64 on which is mounted a pair of auxiliary rails 65, the rails 65 being inboard of and at the same height as the rails 63. The assembly 64 comprises side members 66 joined by cross bars 67, the rails 65 being fixed to the side members 66 and the latter being supported on a number of rollers 68 journaled on the turntable. The auxiliary rail assembly 64 thus is slidable diametrally of the turntable from a retracted position as shown in FIGS. 2, 5, and 7 to a projected position in which the rails 65 extend radially beyond one side or the other of the carriage 31.

Means for moving the auxiliary rail assembly 64 between its retracted and projected positions comprises a reversible hydraulic motor 70 (FIG. 7) connected by suitable conduits and valving (not shown) to the hydraulic pump 44 and being mounted beneath the platform 53 on the turntable 32. The hydraulic motor drives a sprocket wheel 71 around which is trained a chain 72 that also is trained around sprockets 73 mounted midway between the auxiliary rails 66 on parallel bars 74 and connected at their opposite ends to frame members 75 which span the recess in the platform 53 and are fixed to the latter in any suitable manner so as to avoid interference with movements of the rotary rail assembly 64. At about the longitudinal center of the assembly 64 the chain 72 is fixed to one of the cross bars 67 so that driving of the chain 72 in one direction will effect projection of the auxiliary rail assembly 64 radially of the turntable 32. Driving of the chain 72 in the opposite direction will affect movement of the assembly 64 from its projected position toward its retracted position.

An upstanding framework 77 is mounted on the turntable for rotation therewith and comprises a pair of upright supports 78 fixed to the platform 53 on opposite sides of the auxiliary rail assembly 64. From the supports 78 extend braces 79 which support an upstanding frame 80. At the upper end of the frame 80 is mounted a rotatable reel 81 on which is wound an electrical conduit 82 for a purpose presently to be explained. The conduit 82 is supplied with electrical energy from a suitable source via electrical supply lines (not shown) coupled to the conduit 82 via the reel 81.

The construction and arrangement of the turntable as thus far described are such that the platform 53, the rails 63, the auxiliary rail assembly 64, and the framework 50 are rotatable from the position shown in FIG. 5 counterclockwise through 180°. At any position of the turntable the auxiliary rail assembly 64 may be projected and retracted. In the disclosed arrangement, however, projection and extension of the auxiliary rails is contemplated only when the assembly 64 is transverse to the path of horizontal movement of the carriage 31.

THE TRANSFER VEHICLE

Figure 8:
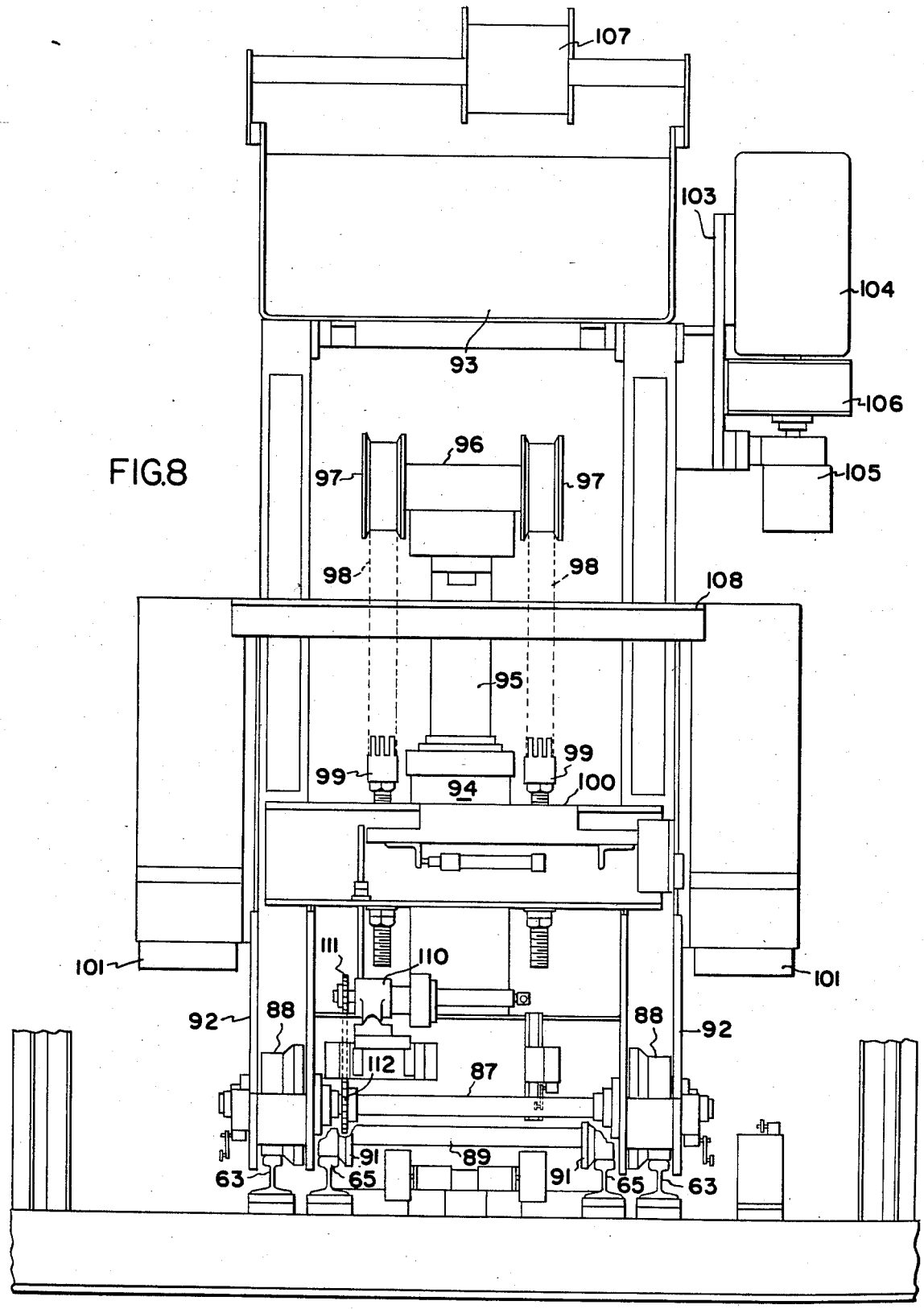
FIG. 8 is a rear elevational view of the transfer vehicle and a portion of the rotary turntable.
Figure 9:
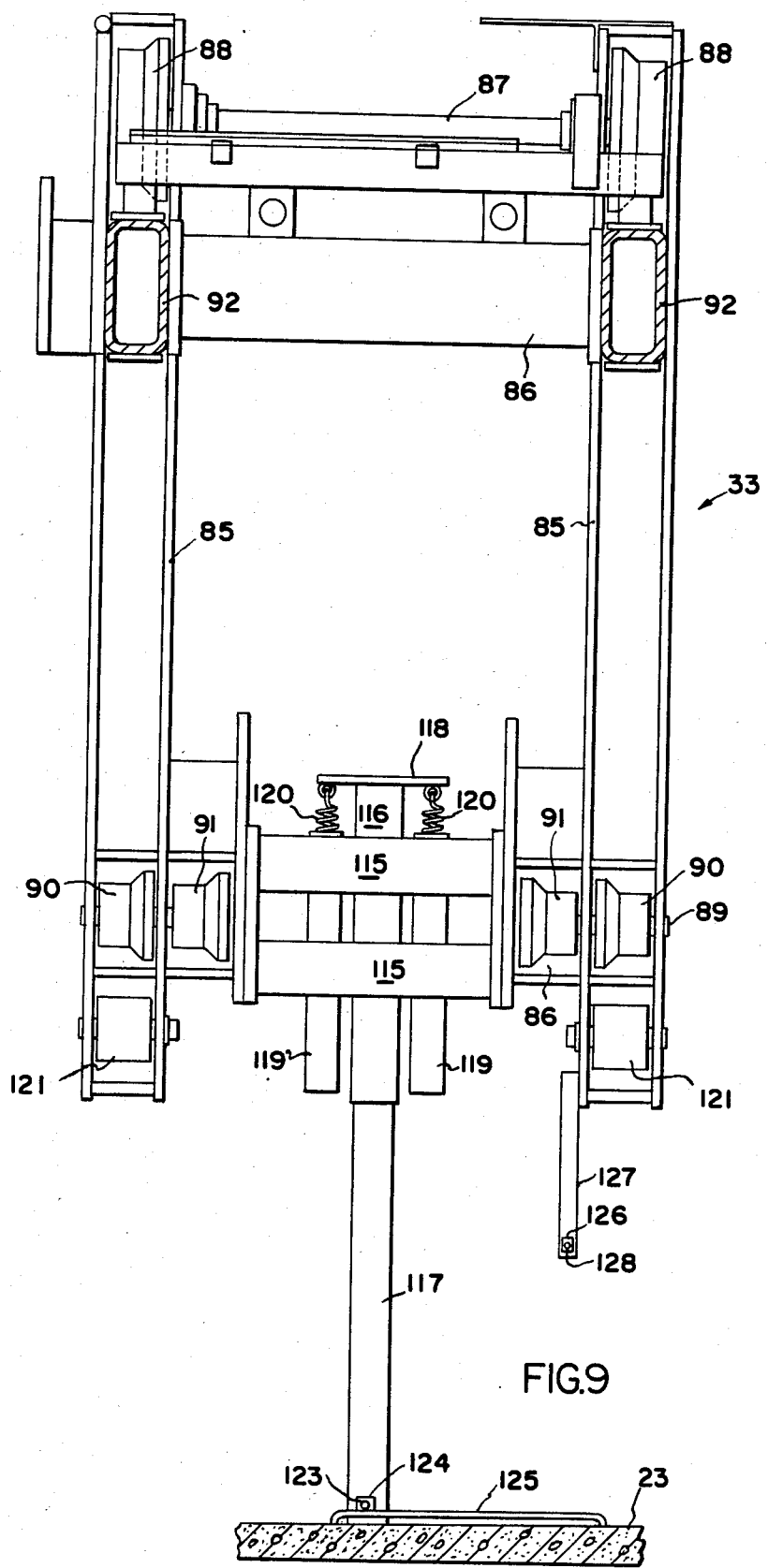
FIG. 9 is a top plan view of the transfer vehicle.

The transfer vehicle 33 is best illustrated in FIGS. 7–9 and comprises a frame composed of horizontal, hollow side beams 85 connected by hollow cross beams 86. Fixed on an axle 87 journaled in and spanning the beams 85 at the rear of the latter is a pair of flanged wheels 88. Journaled on an axle 89 spanning the beams 85 at the forward ends thereof is a pair of flanged outboard wheels 90 and a pair of flanged inboard wheels 91. The spacing between the pairs of wheels 88 and 90 corresponds to the spacing between the rails 63 carried by the turntable platform 53, and such spacing between these pairs of wheels also corresponds to the spacing between the rails 26 of the kiln 20. The spacing between the pair of inboard wheels 91 corresponds to the spacing between the rails 65 of the auxiliary rail assembly 64.

Adjacent the rear of the beams 85 is mounted a pair of upstanding supports 92 between which is fixed a lower cross beam 93. Anchored to the cross beam 86 is one end of a hydraulic cylinder 94. Reciprocable within the cylinder 94 is a piston rod 95 which mounts at its upper end a housing 96 through which extends a shaft fitted at its opposite ends with a pair of pulleys 97. Trained around each pulley is a chain 98 one end of which is coupled, by adjustable couplings 99, to a fixed, horizontal frame member 100 and the opposite end of which is fixed to a vertically movable support which carries a pair of spaced apart arms or fork members 101.

Fixed to one of the upright beams 92 is a mounting bracket 103 on which is supported an electric motor 104 coupled to a hydraulic pump 105 via a suitable coupling 106. The pump 105 communicates with the cylinder 94 via suitable conduits and valving (not shown) to effect extension and retraction of the piston rod 95 relative to the cylinder 94. Extension of the piston rod will effect upward vertical movement of the forks or arms 101 via the chains 98, whereas retraction of the piston rod 95 into the cylinder 94 will effect lowering of the arms 101.

The cross beam 93 provides a reservoir of hydraulic fluid for the pump 105 and, in addition, includes at its upper end a coupling 107 into which the power conduit 82 is fitted. From the coupling 107 extend electrical conduits (not shown) connected to the electrical apparatus of the vehicle 33.

The wheels 88 of the transfer vehicle are drivable in either of two opposite directions by means of a hydraulic motor 110 coupled by conduits and valving (not shown) to the pump 105. The motor 110 is connected by a chain 111 to a sprocket 112 fixed on the shaft 87 so as to rotate the shaft and each of the wheels 88.

At the forward end of the transfer vehicle is a subframe comprising parallel members 115 through which extends a tubular support 116 open at its opposite ends. The support 116 is welded or otherwise suitably fixed to the members 115. Slidably accommodated in the support 116 is an elongate, displaceable rod 117 at the rear end of which is fixed a bar 118.

Also fixed to the members 115 is a pair of tubular housings 119 straddling the support 116. In each of the members 119 is anchored one end of a tension spring 120, the opposite end of which is anchored to the bar 118. The arrangement is such that the springs 120 normally maintain the rod 117 in its forwardly projected position, as shown in FIG. 9, as is determined by engagement of the plate 118 with the rear end of the support member 116. The rod 117 is rearwardly displaceable against the bias of the springs 120, however, for a purpose presently to be explained.

Preferably, the transfer vehicle 33 includes, at its forward end, a pair of rollers 121 which are spaced to correspond to the spacing of the rails 63 and 26 so as to provide additional stability for the vehicle.

THE OPERATION

When the apparatus is conditioned for operation, the rack 4 will contain at least one rack 7 of green or uncured blocks 5 and the rack 7 will be at rest. The carriage 31 will be driven along the rails 29 until such time as the transfer vehicle 33 is in a position adjacent the rack 7. During movement of the carriage, the turntable 32 will be rotated so that the forks 101 face in the direction of the rack 7 and the forks 101 will be adjusted vertically to a position in which they may pass beneath the lower frame bars 9 of the rack.

When the transfer vehicle 33 is in position adjacent the rack 7, the auxiliary rail assembly 64 is projected radially of the turntable 32 so that the auxiliary rails 65 underlie the rack. As the auxiliary rail assembly 64 is projected, the wheels 76 bear against the surface 15 to provide support for the forward end of the assembly 64.

Following projection of the auxiliary rail assembly, the transfer vehicle 33 is driven forwardly so as to move the fork arms 101 beneath the rack. As the vehicle 33 moves forwardly, the rear wheels 88 will remain in engagement with the rails 63 and the wheels 91 will engage and ride upon the auxiliary rails 65.

When the fork arms 101 span the rack 7, the forks 101 are raised to lift the rack off the conveyor 4. The transfer vehicle 33 then is driven rearwardly so as to return it to the turntable 32. When the transfer vehicle has been returned to the turntable, the auxiliary rail assembly 64 is retracted.

Following retraction of the auxiliary rail assembly 64, the carriage 31 may be driven along the rails 29 toward a selected one of the kiln compartments K1 ... K9, the door 25 of which will be open. As the carriage 31 moves toward the selected kiln compartment, the turntable 32 is rotated through 180° so as to enable the forks 101 to face the kiln compartments on the opposite side of the path of movement of the carriage (Cf. FIGS. 1 and 2).

When the carriage 31 arrives at the selected kiln compartment, the carriage is so positioned that the rails 26 in the kiln compartment are aligned with the rails 63 on the turntable 32. Positioning of the carriage 31 adjacent a selected kiln to obtain registration of the rails 26 and 63 is facilitated by the use of a photoelectric cell 130 mounted on the carriage in a position to direct a beam of light toward a reflector 131 mounted at the mouth of each kiln compartment. Reflection of the light beam from the reflector to the cell will generate a signal indicating proper positioning of the carriage. Each reflector 131 is mounted in its associated kiln compartment in such position as to be covered by the door 25 when the latter is closed.

Following alignment of the rails 26 and 63, the transfer vehicle 33 is driven so as to cause it to move off the turntable 32 onto the kiln rails 26 toward that end of the kiln remote from the carriage 31. As the transfer vehicle moves into and along the kiln compartment, the conduit 82 will be unwound from the drum 81, thereby providing a continuous supply of electrical energy to the transfer vehicle. The movement of the transfer vehicle along the kiln compartment preferably is at a relatively high rate of speed. It is desirable, therefore, to decelerate the movement of the transfer vehicle just prior to the time that the rack 7 is to be deposited within the kiln.

As is indicated in FIG. 9, the rod 117 projects a substantial distance forwardly of the transfer vehicle 33 so as to be able to engage the inner surface of the rear wall 23 of the kiln compartment. Engagement of the rod 117 with the wall 23 will not affect forward movement of the vehicle 33, however, inasmuch as the rod 117 is capable of relative telescoping movement with its support 116. Preferably, the forward end of the rod 117 is provided with an upstanding switch actuator 123 that is capable of effecting closing of a normally open switch 124. A bar 125 is fixed on the kiln wall 23 in such position as to engage the switch actuator 123 and deflect it so as to close the switch 124. The switch 124, when closed, operates a signal in response to which movement of the vehicle 33 is decelerated, but the vehicle continues to move toward the end of the kiln compartment. As the vehicle 33 approaches the end of the kiln compartment, a second switch 126 mounted on an arm 127 at the forward end of the vehicle has its actuator 128 deflected by the bar 125 in response to which the vehicle 33 may be stopped with the rack 7 very close to the end wall 23 of the kiln.

When the vehicle 33 has been stopped, the forks 101 are lowered to deposit the rack 7 on the floor of the kiln. Downward movement of the forks continues so as to space the forks below the lower frame members 9 of the rack. Thereafter, the vehicle 33 is driven along the kiln in a direction to return it to the turntable 32.

Following the return of the vehicle 33 to the turntable 32, the carriage 31 may be returned to a position alongside the rack 4 for the purpose of transferring another rack 7 from the rack conveyor to the kiln in the same manner as previously described.

When the second and subsequent racks are deposited in the kiln compartment, the rod 117 will not engage the rear wall 23 of the kiln compartment, but the switch actuators 123 and 128 will engage the lower frame member 9 of the last-deposited rack with the same effect as if the switch actuators engaged the bar 125.

In the illustrative embodiment of the invention the rack conveyor 4 is adapted to serve as a point from which green blocks are transferred to the kiln and the point to which cured blocks are transferred from the kiln. In such an arrangement transfer of cured blocks from the kiln to the rack conveyor is accomplished by locating the carriage 31 at the mouth of a kiln containing racks of cured blocks. In the retrieval of cured blocks from the kiln, the transfer vehicle 33 is driven into the kiln toward the racks therein. The forks 101 are lowered to a position in which they may pass beneath the lower frame members 9 of the rack, and the switches 124 and 126 may be utilized to effect stopping of the vehicle in a position with its forks 101 beneath a rack. The forks 101 are then elevated to lift the rack off the floor of the kiln, following which the vehicle 33 is returned to the carriage 31. The carriage 31 then is driven along the rails 29 to the position in which the carriage is adjacent a vacant portion of the rack conveyor 4 and the turntable 32 rotated so as to position the rack supported on the transfer vehicle in confronting relation to the rack conveyor 4. The auxiliary rail assembly 64 is extended, as described earlier, and the transfer vehicle is driven onto the auxiliary rails. The forks 101 are lowered so as to deposit the rack 7 on the pads 18 of the rack conveyor 4, following which the forks 101 are lowered further out of engagement with the rack, the transfer vehicle is returned to the turntable, and the auxiliary rail assembly is retracted.

When returning a rack 7 to the rack conveyor 4 it is important that the legs 13 of the rack be aligned with the pads 18 on the chains 14. Apparatus constructed according to the invention includes mechanism for aligning the rack legs and the conveyor pads and comprises rack leg locater means 133 mounted on the carriage and pad locater means 134 mounted on the conveyor support 15.

The rack leg locater means 133 is best shown in FIGS. 5 and 6 and comprises an upstanding arm 135 pivoted as at 136 at its lower end on the carriage 31 for swinging movements as indicated by the arrow 137 in FIG. 6. At its upper end the arm 135 carries a bar 138 that is adapted to bear against a leg 13 of a rack 7 supported on the forks 101 of the transfer vehicle 33. Swinging movement of the arm 135 is imparted by a hydraulic ram 139 connected between the arm and a bracket 140 mounted on the carriage, the ram being connected to the hydraulic pump 44 by suitable conduits and valving (not shown). Also mounted at the upper end of the arm 135 is a photocell 141.

The arm 135 normally occupies a position displaced counterclockwise from that shown in FIG. 6. Prior to return of a rack 7 from the transfer vehicle 33 to the conveyor 4, however, the ram 139 is actuated to move the arm clockwise until the bar 138 engages the adjacent leg 13 of the fork-supported rack 7. Upon engagement of the bar 138 with the rack leg, the photocell 141 will be at a predetermined distance from the leg 13.

The conveyor pad locating or detecting means 134 is best illustrated in FIGS. 10 and 11 and comprises an upstanding mounting plate 142 fixed to the conveyor support 15 adjacent the chain 14 that is nearer the path of movement of the carriage 31. Extending through the plate 142 is a slot 143 having a horizontal forward portion 144 and an upwardly inclined rearward portion 145. At the rear end of the plate 142 is a lug 146 to which is pivoted one end of a fluid cylinder 147 connected by suitable conduits and valving (not shown) to a source of pressure fluid. A reciprocable piston rod 148 extends from the cylinder and is connected at its free end to a block 149 to which is fixed a depending finger 150. Also fixed to the block 149 is an upstanding housing 151 which straddles the plate 142. The parts 150 and 151 are reciprocable with the piston rod 147. Mounted on the housing 151 is a reflector 152 which faces the path of movement of the carriage 31 and is at such level as to reflect a light beam emitted by the photocell 141 on the carriage 31.

To the housing 151 is fixed a pin 153 which extends through the slot 143. Journalled on the pin is a roller 154 which rides in the slot 143.

During movement of the conveyor chain 14 in the direction of the arrow 155, the piston rod 148 is retracted into the cylinder 147 so as to locate the roller 154 in the inclined slot portion 145, thereby raising the finger 150 above the level shown in FIG. 10 to avoid interference between the finger and the pads 18. When the conveyor chain is at rest, the piston rod 148 is extended from the cylinder, whereupon the movement of the roller through the slot 143 lowers the finger 150 to a level at which it may engage the nearest pad 18. Extension of the piston rod continues until the finger 150 engages the nearest pad 18, as indicated in dotted lines in FIG. 10, whereupon movement of the piston rod terminates. In these positions of the parts the reflector 152 is in a position to intercept the light beam emitted from the photocell 141.

When the movement of the carriage 31 alongside the conveyor 4 has progressed to the point that the light beam from the photocell 141 is reflected by the reflector 152, a signal is generated in response to which movement of the carriage is halted. The position of the carriage then will be such that the rack leg 13 engaged by the locater bar 138 will be aligned with that conveyor pad 18a adjacent the pad engaged by the locater finger 150. The spacing between the pad 18a and the pad associated therewith corresponds, of course, to the spacing between the legs 13 of the rack. Thus, advancement of the transfer vehicle 33 toward the conveyor 4 will enable the rack 7 supported on the arms 101 to be lowered onto the pad 18a and its associated pad.

As is shown in FIG. 1, the block making facility includes mechanism 157 of known construction for removing palletized, cured blocks from the racks 7 and delivering them to a conveyor 158 leading to a known depalletizer 159. Blocks are conducted from the depalletizer to a storage or shipping area via a conveyor 160 and pallets are returned to the molding machine via a conveyor 161.

The disclosure is representative of presently preferred apparatus and methods, but is intended to be illustrative rather than definitive thereof, The invention is defined in the claims.

What is claimed is:

1. In combination with a concrete block curing kiln having a plurality of spaced apart, longitudinally extending compartments extending laterally of a path traversing all of said compartments at corresponding ends thereof, first track means defining said path, longitudinally extending second track means for each of said compartments for transferring a concrete block supporting rack comprising vertically spaced supports mounted on vertically extending legs from one position to another, said apparatus comprising a carriage movable along said path on said first track means; an endless rack conveyor traveling parallel to said path and having spaced apart rack support locators thereon spaced apart a distance corresponding to the spacing between the legs of the racks; rack leg locating means on said carriage movable parallel to said path from a removed position to a position engaging a rack on said carriage; first sensing means carried on said rack leg locating means; locator detecting means positioned adjacent said rack conveyor and past which said rack conveyor moves; said locator detecting means including a support member mounted for movement in line with the path of travel of said rack conveyor to engage a locator thereon, a second sensing means mounted by said support member cooperable with said first sensing means to indicate that said carriage and rack conveyor are in a position in which said rack is transferable between said carriage and rack conveyor; rail means carried by said carriage; a transfer vehicle, incorporating rack lift means for supporting a rack of blocks for transferring a rack between said rack conveyor and carriage, and carrying said rack into or out of any selected one of said kiln compartments; said transfer vehicle being movable on the rail means on said carriage and off it onto the rail means in a selected kiln compartment; drive means for moving said lift means vertically; and driving means powered from said carriage for driving said transfer vehicle off said carriage into any selected one of said compartments and returning it.

2. Apparatus according to claim 1 wherein one of said sensing means comprises a photocell and the other of said sensing means comprises a reflector operable to reflect a light beam emitted from said photocell.

3. Apparatus according to claim 2 wherein said one of said sensing means is said first sensing means.

4. Apparatus according to claim 3 wherein said one of said sensing means is said second sensing means.

5. The combination of claim 1 in which said support member is also mounted for travel vertically to a position in which it clears the path of travel of a locator on said rack conveyor means.

6. The combination of claim 1 in which said support member is cooperable with a camtrack provided on said locator detecting means which lowers it to a locator engaging level when said support member is moved to engage a locator.

7. Apparatus for transferring racks of uncured concrete blocks from a first position along a path to a selected one of a plurality of curing kiln compartments spaced longitudinally along and at one side of said path, the racks comprising horizontally positioned supports mounted on vertically extending legs, said apparatus comprising a carriage movable along said path from said first position to a second position adjacent any selected one of said compartments; rack conveyor means traveling parallel to said path and having spaced apart locators thereon spaced apart a distance corresponding to the spacing between the legs of the racks; rack leg locating means on said carriage movable generally parallel to said rack conveyor means from a removed position to a position engaging a rack on said carriage; first sensing means on said rack leg locating means; locator detecting means adjacent said rack conveyor means and past which said rack conveyor means travels; said locator detecting means including a support member mounted for movement along the path of travel of said rack conveyor means to engage a locator thereon, and a second sensing means mounted by said support member cooperable with said first sensing means to indicate relative positions of said carriage and rack conveyor means in which a rack is transferable between said carriage and rack conveyor means; rail means carried by said carriage; a transfer vehicle, including rack lift means, for transferring a rack between said rack conveyor means and carriage and for carrying said rack into or out of any selected one of said kiln compartments; drive means on said carriage for moving said lift means vertically; wheel means mounting said transfer vehicle for travel on said carriage rail means; driving means powered from said carriage for driving said transfer vehicle off said carriage into any selected one of said compartments and returning it; means coupled to said carriage for driving the latter along said path between said first and second positions; and tracks in each of said compartments for supporting the wheels of said transfer vehicle.

* * * * *